United States Patent
Saito

(10) Patent No.: US 7,962,952 B2
(45) Date of Patent: Jun. 14, 2011

(54) INFORMATION PROCESSING APPARATUS THAT EXECUTES PROGRAM AND PROGRAM CONTROL METHOD FOR EXECUTING PROGRAM

(75) Inventor: Kazuo Saito, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1214 days.

(21) Appl. No.: 11/581,109

(22) Filed: Oct. 13, 2006

(65) Prior Publication Data

US 2007/0136728 A1   Jun. 14, 2007

(30) Foreign Application Priority Data

Nov. 30, 2005   (JP) ................................ 2005-345074

(51) Int. Cl.
G06F 15/16 (2006.01)
(52) U.S. Cl. ............ 726/4; 713/189; 713/194; 707/705; 707/E17.009
(58) Field of Classification Search ...... 726/4; 718/100; 711/163; 710/26; 719/310; 717/124, 127; 713/189, 194; 707/705, E17.009
See application file for complete search history.

(56) References Cited

U.S. PATENT DOCUMENTS

| 5,684,995 | A  | * | 11/1997 | Yoshihara | ................. | 717/162 |
| 6,934,887 | B1 |   | 8/2005  | Baldischweiler |   |   |
| 7,000,087 | B2 | * | 2/2006  | Atherton et al. | ............. | 711/170 |
| 7,051,200 | B1 | * | 5/2006  | Manferdelli et al. | ......... | 713/153 |
| 7,149,863 | B1 | * | 12/2006 | Chew et al. | .................. | 711/170 |
| 7,546,587 | B2 | * | 6/2009  | Marr et al. | .................. | 717/127 |
| 7,558,986 | B2 | * | 7/2009  | Abe | .............................. | 714/38 |
| 2003/0097536 | A1 | * | 5/2003 | Atherton et al. | ............. | 711/170 |
| 2004/0098724 | A1 | * | 5/2004 | Demsey et al. | ............... | 718/104 |
| 2005/0235136 | A1 | * | 10/2005 | Barsotti et al. | .................... | 713/1 |

FOREIGN PATENT DOCUMENTS

| CN | 1375084 | 10/2002 |
| JP | 2005166051 | 6/2005 |

OTHER PUBLICATIONS

Notice To Submit Argument For Korean Patent Application Serial No. 10-2006-0108147, with English translation, from the Korean Patent Office.
Yu-An Tan et al., "Method of Preventing Buffer Overflow Attack by Intercepting DLL Functions"; School of Information Science and Technology, Beijing Institute of Technology, Beijing, China; 2005; vol. 14, No. 3; pp. 255-259.
Office Action issued on May 16, 2008 from the Chinese Patent Office for corresponding Chinese Patent Application No. 1375084, with English translation.

* cited by examiner

Primary Examiner — Thanhnga B Truong
(74) Attorney, Agent, or Firm — Gauthier & Connors LLP

(57) ABSTRACT

There is provided a computer readable medium storing a subprogram causing a computer to execute a subprocess that includes a predetermined process performed in response to a call from a caller program and a return process to return the result of the predetermined process to the caller program. The subprocess includes: an address acquisition process that acquires an access destination address to be accessed by the subprogram before executing the return process, the access destination address being assigned to the memory area of the caller program; a determination process that determines whether or not the caller program is a legitimate caller program based on the acquired access destination address; and a termination process that, if it is determined that the caller program is not a legitimate caller program as a result of the determination, terminates execution of the subprocess before executing the return process.

12 Claims, 6 Drawing Sheets

| ADDRESS | CONTENT |
|---|---|
| | |
| 0x41000 | mov eax, 0x776 |
| | push eax |
| | call 0x1001000 |
| 0x41009 | pop ebx |
| | pop eax |
| | ... |
| | |
| 0x1001000 | mov eax, esp |
| | add esp, 4 |
| | mov ebx, [esp] |
| | ... |
| | |
| | 0x41009 |
| | 0x776 |
| 0x12FFC | 0x0000 |
| | ... |

M10 — MAIN PROGRAM AREA

M12 — SUBPROGRAM AREA

M14 — STACK AREA

Fig. 3

INFORMATION PROCESSING APPARATUS THAT EXECUTES PROGRAM AND PROGRAM CONTROL METHOD FOR EXECUTING PROGRAM

BACKGROUND

1. Technical Field

The present invention relates to a subprogram which performs a predetermined process in response to a call from a main program and returns the result of the process to the main program.

2. Related Art

There has been conventionally known a subprogram, such as a plug-in, which performs a predetermined process in response to a call from a main program and returns the result of the process to the main program.

The result of the process returned from the subprogram to the main program may include such data as may cause a problem if used in an unauthorized manner, such as access right information related to restriction of use, unpublicized information, or a decryption key.

There is known an attack of spoofing the main program when such data with high confidentiality is handed from the subprogram to the main program. As such an attack, there is an attack of falsifying the main program itself or an attack of intruding between the main program and the subprogram to sniff or falsify data exchanged between them.

SUMMARY

According to an aspect of the invention, there is provided a computer readable medium storing a subprogram causing a computer to execute a subprocess that includes a predetermined process performed in response to a call from a main program and a return process to return the result of the predetermined process to the main program. The subprocess includes: an address acquisition process that acquires, before executing the return process, an access destination address to be accessed by the subprogram, the access destination address being assigned to the memory area of the main program; a determination process that determines whether or not the main program is a legitimate main program based on the acquired access destination address; and a termination process that, if it is determined that the main program is not a legitimate main program as a result of the determination, terminates execution of the subprocess before executing the return process.

BRIEF DESCRIPTION OF THE DRAWINGS

An exemplary embodiment of the present invention will be described in detail based on the following figures, wherein:

FIG. 3 is a schematic diagram of an address space constructed in a main memory;

DETAILED DESCRIPTION

An exemplary embodiment preferred for implementing the present invention (hereinafter referred to as an exemplary embodiment) will be described below with reference to drawings.

Figure 1:
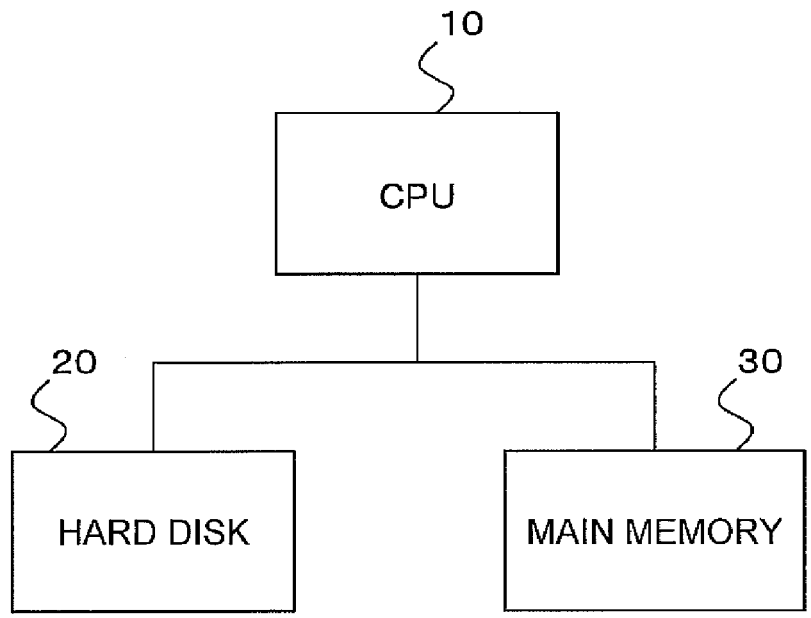
FIG. 1 is a diagram showing functional blocks of an information processing apparatus in an embodiment and first to third variation examples.

FIG. 1 shows functional blocks of an information processing apparatus according to this exemplary embodiment. In FIG. 1, a CPU 10 is a central processing unit which controls the entire information processing apparatus. A hard disk 20 is an auxiliary storage device which stores programs operating on the information processing apparatus. A main memory 30 is a main storage device which temporarily holds a program when the program is executed on the information processing apparatus.

When a program is executed on the information processing apparatus configured as described above, the CPU 10 acquires a specified program from the hard disk 20 and loads it into the main memory 30 first. Furthermore, the CPU 10 fetches a processing command described in the program from the main memory 30 and decodes the content of the command. Thereby, the information processing apparatus can execute the program.

Figure 2:
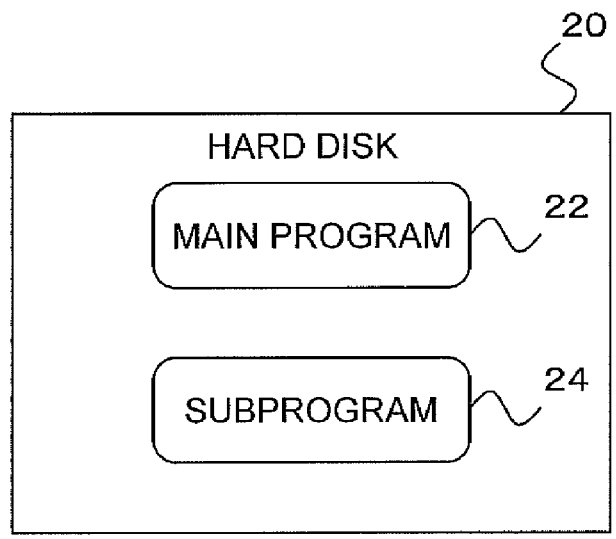
FIG. 2 is a conceptual diagram of a hard disk provided for the information processing apparatus.

In this exemplary embodiment, at least a main program 22 and a subprogram 24 are stored in the hard disk 20 as shown in FIG. 2.

The main program 22 is main software for executing a particular process on the information processing apparatus, and it is, for example, an application program. As the application program, there are, for example, word processing software, spreadsheet software, document browsing software, image editing software, database software, presentation software, game software, a Web browser, e-mail software and the like. Accounting software, personnel management software and inventory management soft used in companies are also kinds of application program.

The subprogram 24 is software independent from the main program 22, and it is an auxiliary program which enables a third party or the like to add their own function to the main program 22 later without changing the main program 22. The subprogram 24 is called by the main program 22 to perform a predetermined process and return the result of the process to the main program 22. A series of processes which the subprogram 24 performs in response to a call by the main program 22 is hereinafter referred to as a "subprocess". And the main program which calls the subprogram is referred as a "caller program", and the subprogram is referred as a "called program".

The subprogram 24 is, for example, a so-called plug-in. When the main program 22 operates on Windows (registered trademark), one of basic OS's (operating systems), the subprogram 24 is often realized by a DLL (dynamic link library).

FIG. 3 is a diagram schematically showing the address space of the main memory 30 in the case where the subprogram 24 is called by the main program 22. As shown in FIG. 3, the address space constructed on the main memory 30 is divided into some areas according to purposes. In this exemplary embodiment, a main program area M10 for storing program data of the main program 22, a subprogram area M12 for storing program data of the subprogram 24, and a stack area M14 for storing various variable data are constructed. In the stack area M14, a "return destination address" and the like which play an important role in this exemplary embodiment are stored. The return destination address is an address to which execution control is shifted from the subprogram 24 when processing is returned to the main program 22 after the subprogram 24 has performed the predetermined process. This address is an address assigned to the main program area M10.

A development tool (SDK: software development kit) for developing a subprogram such as a plug-in is often made public so that addition of a function to a main program can be freely realized by a third party. It is often possible that the subprogram such as a plug-in can be called by programs other than a corresponding main program. In such a case, it is relatively easy to create a module for monitoring or changing data exchanged between the main program and the subprogram. Though the subprogram with high versatility, such as a plug-in, is very useful, a security problem may be caused when the subprogram is a module which provides a security function.

For example, it is assumed that the subprogram is a module which provides a function of, only when the subprogram is called by an authorized user, decrypting encrypted content to enable the content to be used. In some cases, such a subprogram performs a process of authenticating the right of a user in response to a call by a caller program, and, if the authentication is successful, handing a key to decrypt content to the caller program. Alternatively, there may be a case where the subprogram 24 hands right information about encrypted content, such as "only browsing", "editing enabled" and "printing enabled", to the caller program, and the caller program performs security control of the content based on the handed right information.

In the case where the security function as described above is provided by the subprogram, there is a possibility that unauthorized access will performed such as for unauthorized acquisition of a key to decrypt the encrypted content or for falsification of information about the right to the content with the use of a tool for monitoring or changing data exchanged between the main program and the subprogram as described above.

There is known a technique about an authentication function in which, in order to prevent such unauthorized access, a main program authenticates a subprogram which it calls by confirming a digital signature or the like, and the called subprogram is caused to continue a process only when the authentication is successful.

However, even if the main program provides such an authentication function, it is not possible to protect data exchanged between the main program and the subprogram because the subprogram does not authenticate the main program.

Therefore, in this exemplary embodiment, the data exchanged between the main program 22 and the subprogram 24 is protected by confirming whether the subprogram 24 is directly called by the correct main program 22.

Now, description will be given on the procedure of the subprogram 24 according to this exemplary embodiment performed in the case where the subprogram 24 is called by a caller program, with reference to the flowchart shown in FIG. 3.

First, when receiving a call from a caller program, the subprogram 24 acquires a return destination address from the stack area M14 of the main memory 30 (S100).

The memory address indicating the location where the return destination address is stored is prespecified by the OS which is the execution environment of the main program 22 or the specifications of a compiler for compiling the main program 22. For example, the memory address is the top address of the stack area M14 at the time when the subprogram 24 is called. The return destination address may be stored not in the stack area M14 but in a particular register depending on the computer architecture.

When the main program 22 calls the subprogram 24, data indicating the return destination address is stored at the top address of the stack area M14. Therefore, the subprogram 24 can acquire the return destination address by accessing a predetermined address.

After acquiring the return destination address, the subprogram 24 acquires memory information about a memory area including the return destination address (hereinafter referred to as a "caller memory area") (S102). As the memory information, there is information about the ready condition of the caller memory area or the top address of the caller memory area. For example, in the case of Windows (registered trademark), the memory information can be acquired with the use of the VirtualQuery function. More specifically, by showing the return destination address, the start address of a buffer area in which memory information to be acquired is stored, and the data size of the buffer area as parameters to the VirtualQuery function and accessing the OS, the subprogram 24 can acquire memory information about the memory area including the return destination address from the OS.

Then, the subprogram 24 determines whether or not the caller memory area is executable by referring to the acquired memory information and a flag set for the memory area (S104). As a result of the determination, if it is determined that the flag is not indicating to be executable (the result of the determination at step S104: negative "N"), then the subprogram 24 determines that there is a possibility that it has been called by a false program pretending to be a legitimate main program, and terminates the subprocess (S106).

On the other hand, if it is determined that the flag is indicating to be executable (the result of the determination at step S104: positive "Y"), then the subprogram 24 acquires the start address of the caller memory area by referring to the acquired memory information (S108), and then acquires attribute information about the caller program based on the start address (S110). Then, the subprogram 24 performs authentication about whether the caller program is the legitimate main program 22 based on the acquired attribute information (S112). For example, the authentication may be performed by verifying whether attribute information corresponding to the legitimate main program 22 which the subprogram 24 has in advance, and the attribute information acquired from the caller program, correspond to each other.

The attribute information is, for example, the filename of the caller program. In the case of Windows (registered trademark), for example, this filename may be acquired with the use of the GetModuleFileName function. More specifically, the subprogram 24 may acquire the filename of the caller program by showing the start address and the like as parameters to call the GetModuleFileName function. The subprogram 24 can also acquire the file path to the location where the caller program is stored by calling the GetModuleFileName function. Accordingly, the subprogram 24 may access a file based on the file path and identify the creator, the creation time and the file size of the file. The subprogram 24 may also use these items of information as attribute information. If the legitimate main program 24 is replaced with a false program with the same filename and with the same path, for example, it is not possible to perform correct authentication with only the authentication based on filename. However, if authentication is performed with the use of the attribute information other than the filename as described above, the possibility that correct authentication can be performed is increased even when such malicious replacement is performed.

In the case where a digital signature is attached to the main program 22, the subprogram 24 may check whether a caller program is the legitimate main program 22 by accessing a file corresponding to the caller program to check existence of the digital signature or correctness of the signature because the caller program is attached with the digital signature if it is the legitimate main program 22.

As a result of the authentication, if the authentication of the caller program fails (the result of the determination at step S114: negative "N"), then the subprogram 24 terminates the subprocess (S106).

On the other hand, if the authentication of the caller program succeeds (the result of the determination at step S114: positive "Y"), then the subprogram 24 continues the subprocess (S116).

As described above, the subprogram 24 performs authentication about whether a caller program is the legitimate main program 22 before executing the subprocess in response to a call, and it executes the subprocess only when the authentication succeeds.

Now, the first variation example of this exemplary embodiment will be described.

In the first variation example, authentication about whether a caller program is the legitimate main program 22 is performed by verifying whether a return destination address is the return destination address corresponding to the legitimate main program 22.

Figure 4:
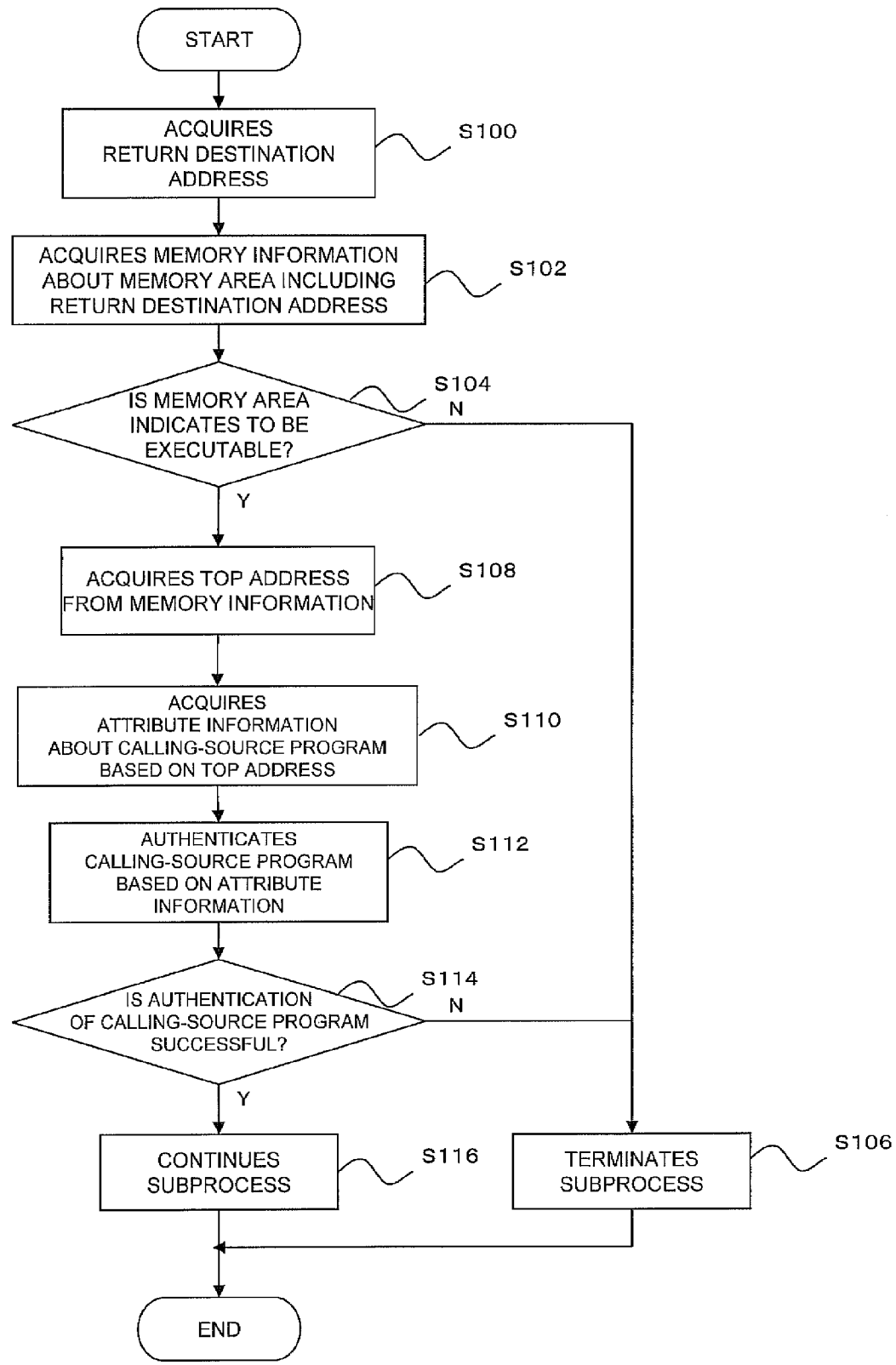
FIG. 4 is a flowchart showing the procedure of a subprogram performed when the subprogram is called by a caller program in the embodiment.
Figure 5:
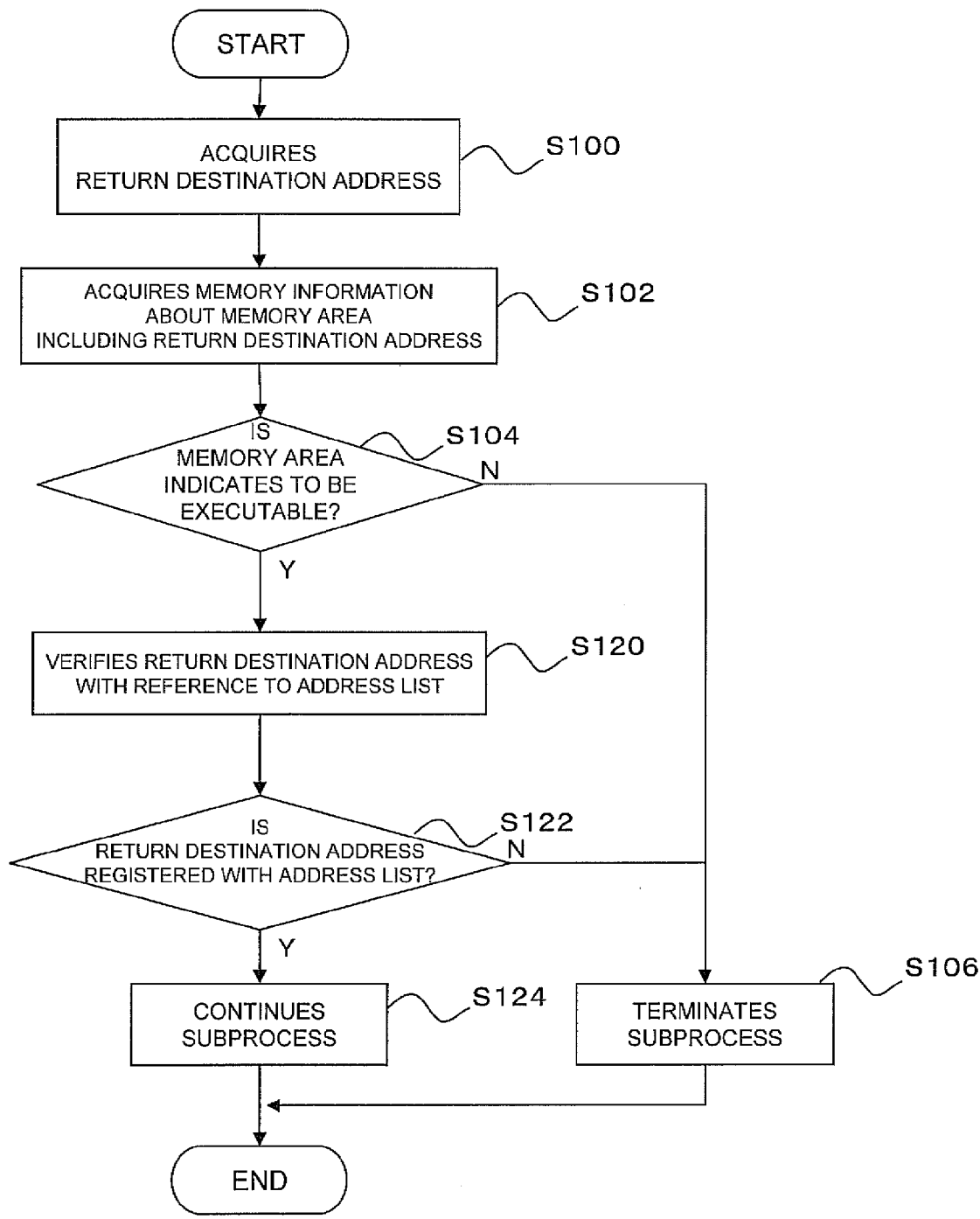
FIG. 5 is a flowchart showing the procedure of a subprogram performed when the subprogram is called by a caller program in the first variation example.

Now, description will be given of the procedure of the subprogram 24 performed when the subprogram 24 is called by a caller program in the first variation example, with reference to the flow chart in FIG. 5. In FIG. 5, since steps S100 to S106 are similar to those in FIG. 4, description thereof will be omitted, and description will be started from step S120.

If it is determined that the flag for the caller memory indicates to be executable (the result of the determination at step S104: positive "Y"), then the subprogram 24 refers to an address list with which the return destination address corresponding to the legitimate main program 22 is registered to verify whether the acquired return destination address is registered with the address list (S120).

This address list can be created at the stage of developing a subprogram. More specifically, the legitimate main program 22 is executed to call the subprogram 24, and the return destination address stored in the stack area M14 then is monitored. Thereby, the return destination address which is stored in the stack area M14 when the legitimate main program 22 is executed is known. Accordingly, by creating a list with which the return destination address is registered, the above address list can be created. Since the legitimate main program 22 may call the subprogram 24 multiple times while executing a series of processes, the number of the return destination addresses registered with the address list is not necessarily limited to one.

As a result of verification of the address list, if it is determined that the acquired return destination address is not registered with the address list (the result of the determination at S122: negative "N"), then the subprogram 24 determines that it is not being called by the legitimate main program 22 and terminates the subprocess (S106).

On the other hand, if it is determined that the acquired return destination address is registered with the address list (the result of the determination at S122: positive "Y"), then the subprogram 24 determines that it is being called by the legitimate main program 22 and continues the subprocess (S124).

As described above, in the first variation example, it is determined whether a caller program is the legitimate main program 22 based on the return destination address of the caller program, and after that, the subprogram 24 continues the subprocess only when the caller program is the legitimate main program 22.

In the above description, a case is not considered where reassignment (relocation) of addresses of the main program area M10 is performed where the program data of the main program 22 is loaded. However, reassignment may be performed depending on the specifications of the OS. In this case, the subprogram 24 may not determine a caller program to be the legitimate main program 22 even if the call is made by the legitimate main program 22.

Therefore, the subprogram 24 may verify whether reassignment has been performed before performing verification with the use of an address list. In this case, if reassignment has been performed, then the subprogram 24 corrects the acquired return destination address.

Figure 6:
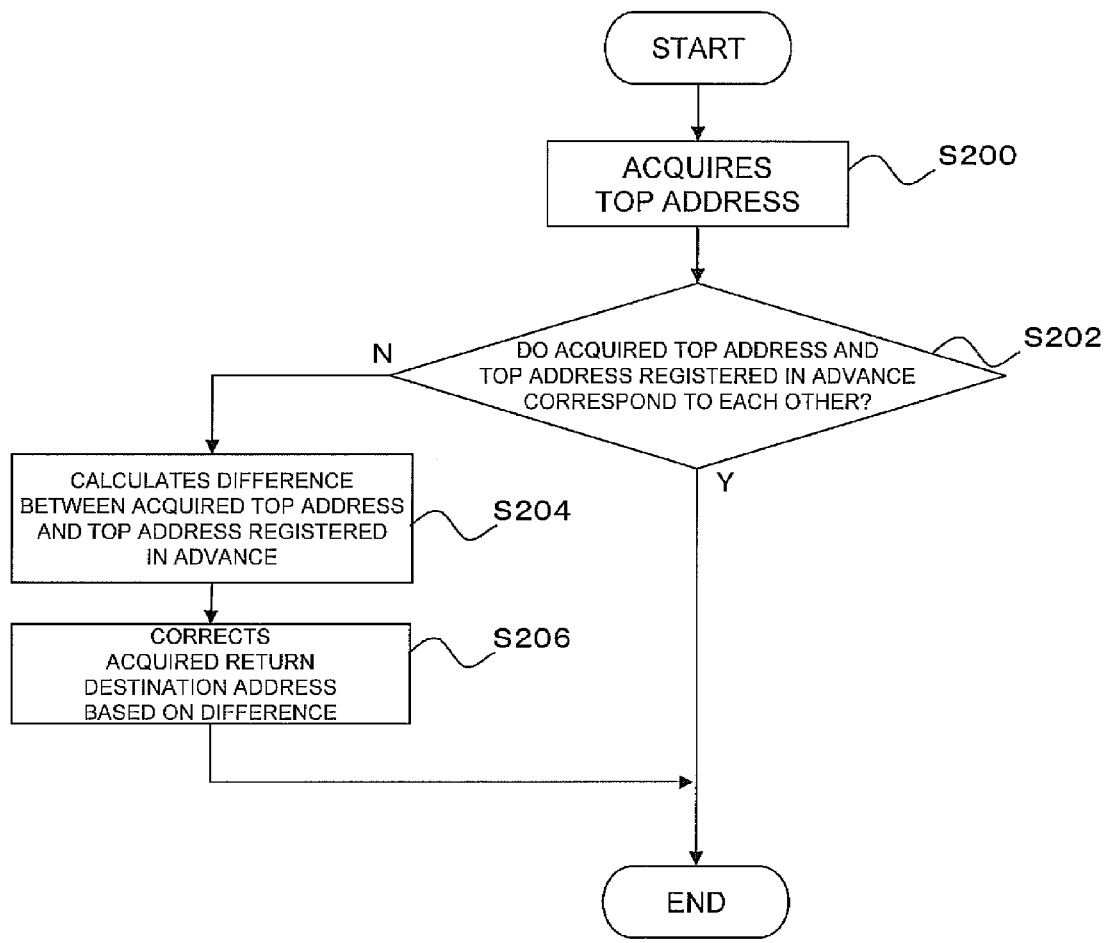
FIG. 6 is a flowchart showing the procedure of a subprogram performed when it is verified whether reassignment has been performed.

Now, further description will be given on the procedure performed when the subprogram 24 verifies whether reassignment of addresses has been performed before performing verification with the use of an address list, with reference to the flowchart shown in FIG. 6.

First, the subprogram 24 acquires the start address of the caller memory area in a method similar to that of the exemplary embodiment described above (S200). Then, the subprogram 24 compares the start address for the legitimate main program 22 stored in advance and the acquired start address with each other to determine whether they correspond to each other (S202).

As a result, if it is determined that they correspond to each other (the result of the determination at step S202: positive "Y"), then the subprogram 24 determines that reassignment of the address of the caller program has not been performed, and it performs the process shown in FIG. 5 with the acquired return destination address.

On the other hand, if it is determined that the return destination addresses do not correspond to each other (the result of the determination at step S202: negative "N"), then the subprogram 24 determines that reassignment of the address of the caller program has been performed, and it calculates difference between the acquired start address and the registered start address (S204). Then, the subprogram 24 corrects the acquired return destination address based on this difference (S206). After that, the subprogram 24 performs the process shown in FIG. 5 using the corrected return destination address.

Depending on the OS on which the subprogram 24 is operating, even if reassignment of addresses of a memory area is performed, address conversion or the like may be performed by the OS side to prevent the program side from being influenced by address change. In such a case, the subprogram 24 can authenticate a caller program without consideration of the reassignment of addresses described above.

Now, the second variation example of this exemplary embodiment will be described.

In the second variation example, the subprogram 24 authenticates a caller program based on program data stored within a predetermined range of addresses which is specified with a return destination address as the reference.

Figure 7:
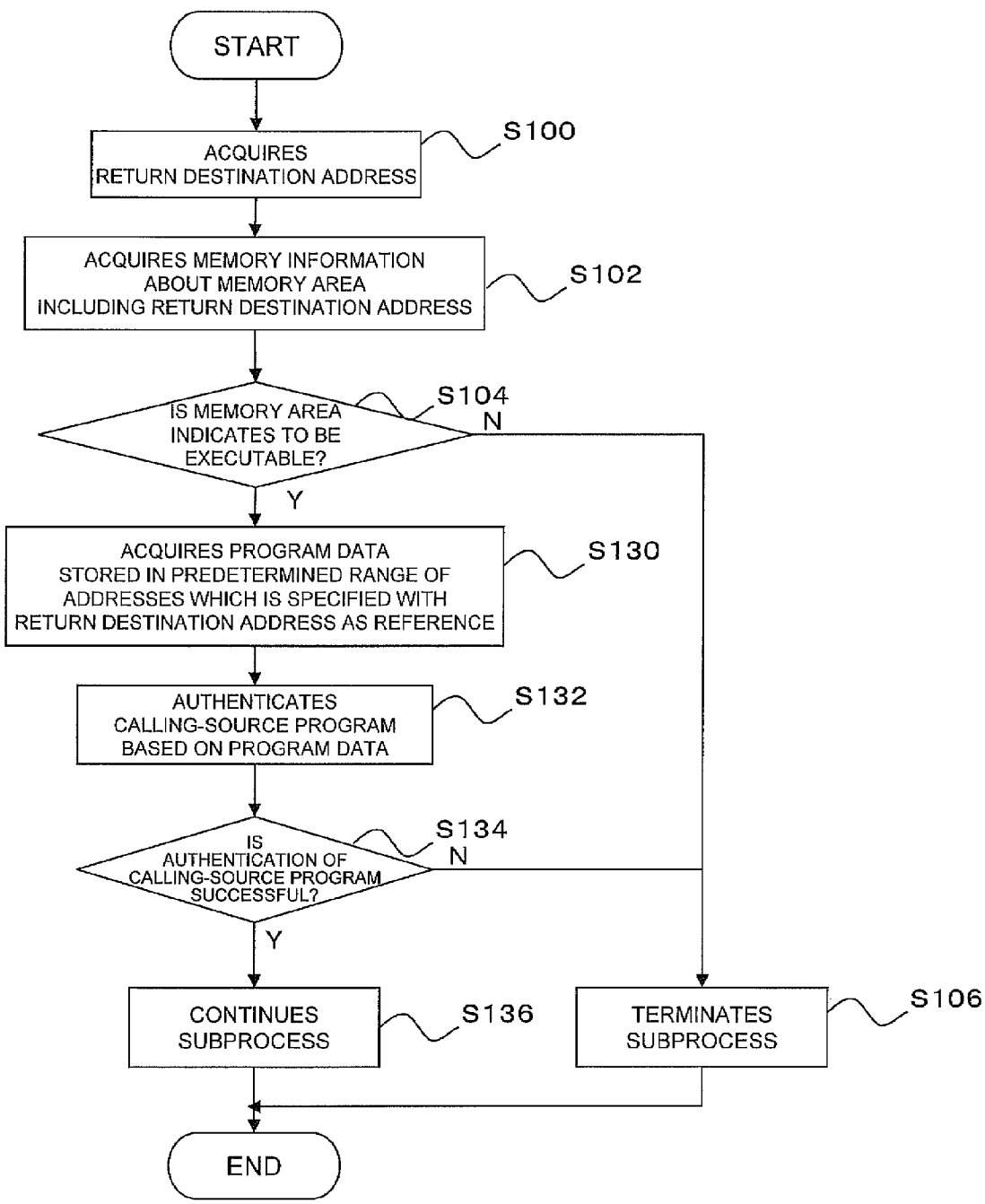
FIG. 7 is a flowchart showing the procedure of a subprogram performed when the subprogram is called by a caller program in the second variation example.

Now, description will be given on the procedure of the subprogram 24 performed when the subprogram 24 is called by a caller program in the second variation example, with reference to the flowchart shown in FIG. 7. In FIG. 7, since steps S100 to S106 are similar processing to that in FIG. 4, description thereof will be omitted, and description will be started from step S130.

If the flag for the caller memory area indicates to be executable (the result of the determination at step S104: positive "Y"), then the subprogram 24 acquires program data stored within a predetermined range of addresses which is specified with the acquired return destination address as the reference from the main memory 30 (S130). The predetermined range of addresses can be determined in advance, for example, as relative addresses with the return destination address as the reference address.

In this case, it is necessary to determine the range within which program data enabling verification about whether the caller program is the legitimate main program 22 is stored, as the predetermined range of addresses. Therefore, it is desirable to specify the range of addresses within which program data specific to the legitimate main program different from other programs is stored as the predetermined range of addresses.

Then, the subprogram 24 performs authentication and verification of the caller program based on the acquired program data (S132).

For example, this verification may be performed as described below. The subprogram 24 keeps in advance the program data of the legitimate main program 22 which is to be loaded within the predetermined range of addresses. The subprogram 24 then compares the program data which it keeps in advance and program data acquired from the memory area where the caller program is loaded with each other to verify whether the caller program is the legitimate main program 22. The verification may be performed not by comparing the program data themselves as described above but, for example, by calculating a characteristic, such as a hash value, for the program data of the legitimate main program in advance and comparing the characteristics.

As a result of the authentication, if authentication of the caller program fails (the result of the determination at step S134: negative "N"), then the subprogram 24 determines that it is not being called by the legitimate main program 22 and terminates the subprocess (S106).

On the other hand, if authentication of the caller program succeeds (the result of the determination at step S134: positive "Y"), then the subprogram 24 determines that it is being called by the legitimate main program 22 and continues the subprocess (S124).

As described above, in the second variation example, after verifying whether program data loaded within a predetermined range of addresses including the return destination address of a caller program is the program data of the legitimate main program 22, the subprogram 24 continues the subprocess only when the calling program is the legitimate main program 22.

Processing commands included in the program data may include address information, such as the case of the JUMP command. Therefore, if reassignment of the addresses of the main program area M10 is performed, the content of the program data may be changed.

Thus, in the second variation example also, it may be necessary to take into account the reassignment of addresses, depending on the specifications of the main program 22.

In this case, addresses where the content of data may be rewritten by reassignment of addresses being performed (hereinafter referred to as "addresses where data is to be rewritten") are excluded in advance from the above predetermined range of addresses, for example. By doing this, such data whose content may be changed by reassignment of addresses is not included in the program data to be verified.

The addresses where data is to be rewritten can be identified, for example, by referring to a table called a relocation table with which addresses where the content of data may be rewritten by reassignment of addresses being performed are registered. In the case where the main program 22 does not provide the relocation table, a list with which addresses where data is to be rewritten are registered is created and loaded in a memory area which can be referred to by the subprogram 24 in advance.

It is also possible to authenticate a caller program not by excluding the addresses where data is to be rewritten but by correcting program data stored at the addresses where data is to be rewritten. In this case, difference is determined with the use of the method shown in FIG. 6, for example, and program data stored in the addresses where data is to be rewritten is corrected based on the difference. That is, addresses included in processing commands loaded at the addresses where data is to be rewritten can be corrected based on the calculated difference.

In the exemplary embodiment and each of the variation examples above, description has been given for the example where the subprogram 24 performs authentication of a caller program with the use of a return destination address which can be acquired from the stack area M14 or the like as the address assigned to the memory area used by the caller program. However, the subprogram 24 can also use addresses other than the return destination address if authentication of a caller program is possible.

In the third variation example of this exemplary embodiment, description will be given for the case where authentication of a caller program is performed with the use of an address indicated by an argument handed when the main program 22 calls a subprogram as the address other than the return destination address.

In the third variation example, a callback address is used as the address indicated by an argument. Here, the callback address means an address where a callback function to be called is stored. The callback function is a function in a caller program, which the subprogram 24 calls in response to a call by the caller program. That is, the subprogram 24 accesses the callback address indicated by an argument handed by the caller program to call the callback function.

The third variation example is different from the above exemplary embodiment in which a return destination address acquired from the stack area M14 or the like is used, in that the subprogram 24 uses the callback address indicated by an argument handed by a caller program. However, the procedure is similar to that of the above exemplary embodiment in other points, and therefore detailed description thereof will be omitted. Refer to the description of the above exemplary embodiment while replacing the return destination address with the callback address as appropriate.

Furthermore, in the procedures in the first and second variation examples also, the callback address can be used instead of the return destination address. In this case also, refer to the description of the first and second variation examples while replacing the return destination address with the callback address as appropriate.

In the case of using the callback address, it maybe necessary to take into account reassignment of addresses of the memory area where the main program 22 is stored. In this case, the subprogram 24 determines whether reassignment of the addresses has been performed, and determines difference if reassignment has been performed, based on the procedure shown in FIG. 6, similarly to the first and second variation examples. Then, the subprogram 24 corrects program data stored at the acquired callback address or in a predetermined range of addresses which is specified with the acquired callback address as the reference, based on the difference, and after that, it performs authentication of the caller program.

The process of authenticating a caller program shown in the exemplary embodiment and each variation example described above can be executed before the subprogram 24 performs the process of returning data obtained as a result of the subprocess to the caller program. For example, the subprogram 24 can perform the process of authenticating a caller program immediately after receiving a call, immediately before calling a callback function or immediately before returning data obtained as a result of the subprocess to the caller program.

Each of the processes described above can be distributed in the form of a program. In this case, the program can be distributed by recording it in a recording medium such as a floppy (registered trademark) disk, a CD-ROM and a DVD. Alternatively, a part or all of the program or a file can be distributed through a transmission medium used by a public network and the like. In this case, a user who receives it can copy the program from a portable recording medium, such as a floppy (registered trademark) disk, a CD-ROM and a DVD, to an external recording section with the use of a reading device (a part of an input/output section) such as a CD-ROM device, or copy the program from the Internet to an external recording section, via the communication section of a computer. The functions described above can be realized on the user's computer by the CPU executing the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A portable recording device storing a program causing a computer to execute a subprocess that includes a process performed in response to a call from a caller program and a return process to return the result of the process to the caller program, the subprocess comprising:
   acquiring an access destination address to be accessed by the program, the access destination address being assigned to a memory area of the caller program;
   acquiring memory information about the memory area used by the caller program based on the acquired access destination address, the memory information indicating if the memory area is executable;
   determining, when acquired memory information indicates that the memory area is not executable, that the caller program is not legitimate;
   if it is determined that the caller program is not legitimate, terminating execution of the subprocess;
   determining, when acquired memory information indicates that the memory area is executable, if the caller program is legitimate caller program based on the acquired access destination address and an original access destination address of a legitimate caller program registered in advance; and
   acquiring a start address of the memory area where the caller program is stored, based on the acquired access destination address;
   if the acquired start address and a start address of the legitimate caller program registered in advance are different, determining the difference;
   correcting the acquired access destination address based on the difference; and
   determining if the caller program is legitimate based on the corrected access destination address.

2. The device according to claim 1, the subprocess further comprising:
   acquiring attribute information about the caller program based on the acquired access destination address; and
   determining, when acquired memory information indicates that the memory area is executable, if the caller program is legitimate based on the acquired attribute information and attribute information about a legitimate caller program registered in advance.

3. The device according to claim 1, the subprocess further comprising:
   determining, when acquired memory information indicates that the memory area is executable, if the caller program is legitimate by referring to an address list with which a group of original access destination addresses of a legitimate caller program is registered.

4. The device according to claim 1, the subprocess further comprising:
   acquiring data which is stored in a range of addresses from a memory, the range being specified based on the acquired access destination address; and
   determining, when acquired memory information indicates that the memory area is executable, if the caller program is legitimate by comparing the acquired data and data to be stored in the range of addresses which is specified with an access destination address of a legitimate caller program.

5. The device according to claim 4, wherein the range of addresses does not include addresses where such data whose content may be changed by reassignment of addresses is stored.

6. The device according to claim 4, the subprocess further comprising:
   acquiring a start address of the memory area where the caller program is stored, based on the acquired access destination address;
   if the acquired start address and a start address of the legitimate caller program registered in advance are different, determining the difference;
   correcting the acquired data based on the difference; and
   determining if the caller program is legitimate based on the corrected data and the data to be stored.

7. A portable recording medium device storing a program causing a computer to execute a subprocess that includes a process performed in response to a call from a caller program and a return process to return the result of the process to the caller program, the subprocess comprising:
   acquiring an access destination address to be accessed by the program, the access destination address being assigned to a memory area of the caller program;
   acquiring memory information about the memory area used by the caller program based on the acquired access destination address, the memory information indicating if the memory area is executable;
   determining, when acquired memory information indicates that the memory area is not executable, that the caller program is not legitimate;

if it is determined that the caller program is not legitimate, terminating execution of the subprocess;
acquiring data which is stored in a range of addresses from a memory, the range being specified based on the acquired access destination address;
calculating a hash value of the acquired data; and
determining, when acquired memory information indicates that the memory area is executable, if the caller program is legitimate based on the calculated hash value and a hash value determined from data to be stored in the range of addresses which is specified based on an access destination address of a legitimate caller program registered in advance.

8. The device according to claim 1, wherein the access destination address is a return destination address to which the program shifts execution control after processes of the program ends.

9. The device according to claim 1, wherein the access destination address is an address indicated by an argument handed by the caller program when the program is called by the caller program.

10. The device according to claim 9, wherein the address is a callback address specified as a callback destination by the caller program.

11. An information processing apparatus comprising:
a processor;
said processor executing a subprocess including a process performed in response to a call from a caller program and a return process to return the result of the process to the caller program;
said processor acquiring an access destination address which the subprocess section accesses when executing the subprocess, the access destination address being assigned to a memory area of the caller program;
said processor acquiring memory information about the memory area used by the caller program based on the acquired access destination address, the memory information indicating if the memory area is executable;
said processor determining, when acquired memory information indicates that the memory area is not executable, that the caller program is not legitimate based on the acquired memory information;
said processor terminating, if it is determined that the caller program is not legitimate, execution of the subprocess;
said processor determining, when acquired memory information indicates that the memory area is executable, if the caller program is legitimate caller program based on the acquired access destination address and an original access destination address of a legitimate caller program registered in advance; and
said processor acquiring a start address of the memory area where the caller program is stored, based on the acquired access destination address;
said processor, if the acquired start address and a start address of the legitimate caller program registered in advance are different, determining the difference;
said processor correcting the acquired access destination address based on the difference; and
said processor determining if the caller program is legitimate based on the corrected access destination address.

12. A program control method for executing a subprogram which performs a subprocess including a process performed in response to a call from a caller program and a return process to return the result of the process to the caller program, comprising:
acquiring, using a processor, an access destination address to be accessed by the subprogram, the access destination address being assigned to a memory area of the caller program;
acquiring, using a processor, memory information about the memory area used by the caller program based on the acquired access destination address, the memory information indicating if the memory area is executable;
determining, using a processor, when acquired memory information indicates that the memory area is not executable, that the caller program is not legitimate based on the acquired access destination address; and
terminating, using a processor, execution of the subprocess if it is determined that the caller program is not legitimate;
determining, when acquired memory information indicates that the memory area is executable, if the caller program is legitimate caller program based on the acquired access destination address and an original access destination address of a legitimate caller program registered in advance; and
acquiring a start address of the memory area where the caller program is stored, based on the acquired access destination address;
if the acquired start address and a start address of the legitimate caller program registered in advance are different, determining the difference;
correcting the acquired access destination address based on the difference; and
determining if the caller program is legitimate based on the corrected access destination address.

* * * * *